(12) United States Patent
Aharoni et al.

(10) Patent No.: US 9,753,916 B2
(45) Date of Patent: Sep. 5, 2017

(54) AUTOMATIC GENERATION OF A SPEECH BY PROCESSING RAW CLAIMS TO A SET OF ARGUMENTS

(71) Applicant: International Business Machines Corporation, Armonk, NY (US)

(72) Inventors: Ehud Aharoni, Kfar Saba (IL); Indrajit Bhattacharya, Bangalore (IN); Yonatan Bilu, Jerusalem (IL); Dan Gutfreund, Raanana (IL); Daniel Hershcovich, Givat Ela (IL); Vikas Raykar, Bangalore (IN); Ruty Rinott, Jerusalem (IL); Godbole Shantanu, Bangalore (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/698,847

(22) Filed: Apr. 29, 2015

(65) Prior Publication Data
US 2015/0371651 A1    Dec. 24, 2015

Related U.S. Application Data

(60) Provisional application No. 62/014,139, filed on Jun. 19, 2014.

(51) Int. Cl.
| | | |
|---|---|---|
| G10L 19/00 | (2013.01) | |
| G06F 17/28 | (2006.01) | |
| G10L 13/027 | (2013.01) | |
| G06F 17/27 | (2006.01) | |

(52) U.S. Cl.
CPC ...... *G06F 17/2881* (2013.01); *G06F 17/2785* (2013.01); *G10L 13/027* (2013.01)

(58) Field of Classification Search
USPC ........................................... 704/201
See application file for complete search history.

(56) References Cited

U.S. PATENT DOCUMENTS

| | | | | |
|---|---|---|---|---|
| 2008/0222279 A1* | 9/2008 | Cioffi | ..................... | G06Q 10/10 709/223 |
| 2012/0158620 A1* | 6/2012 | Paquet | ................. | G06N 99/005 706/12 |
| 2013/0080167 A1* | 3/2013 | Mozer | ..................... | G10L 17/22 704/246 |
| 2014/0032428 A1* | 1/2014 | Tozzi | ..................... | G06Q 10/10 705/309 |

* cited by examiner

*Primary Examiner* — Marivelisse Santiago Cordero
*Assistant Examiner* — Kevin Ky
(74) *Attorney, Agent, or Firm* — Ziv Glazberg

(57) ABSTRACT

A method comprising using at least one hardware processor for: identifying relations between pairs of claims of a set of claims; aggregating the claims of the set of claims into a plurality of clusters based on the identified relations; generating a plurality of arguments from the plurality of clusters, wherein each of the arguments is generated from a cluster of the plurality of clusters, and wherein each of the arguments comprises at least one claim of the set of claims, scoring each possible set of a predefined number of arguments of the plurality of arguments, based on a quality of each argument of the predefined number of arguments and on diversity between the predefined number of arguments; and generating a speech, wherein the speech comprises a top scoring possible set of the possible set of the predefined number of arguments.

20 Claims, 3 Drawing Sheets

AUTOMATIC GENERATION OF A SPEECH BY PROCESSING RAW CLAIMS TO A SET OF ARGUMENTS

CROSS-REFERENCE TO RELATED APPLICATIONS

This application claims the benefit of U.S. Provisional Patent Application No. 62/014,139, entitled "Automatic Construction of a Speech", filed Jun. 19, 2014, the contents of which are incorporated herein by reference in their entirety.

BACKGROUND

The present invention relates to the field of text analysis and synthesis.

Decision making is a fundamental, yet often a challenging task in many fields. A key component in decision making is identifying arguments for and against each possible decision, in order to make an informed decision. Moreover, it is important for such arguments to be phrased in a coherent way, to clearly present a variety of arguments without overly delving into repetitive detail.

Related systems are those which deal with generation of reports in a natural language, based on structured data. Examples include CoGenTex's Forecast Generator (FoG) and Recommender, and Narrative Science's Quill for Google Analytics.

Text mining, also referred to as text analytics (or analysis), is often defined as the automated process of deriving high-quality information from text (specifically, large amounts of text) via computer processing. High-quality information is typically derived through the devising of patterns and trends through means such as statistical pattern learning and machine learning. Text mining usually involves the process of structuring the input text (usually parsing, along with the addition of some derived linguistic features and the removal of others, and subsequent insertion into a database), deriving patterns within the structured data, and finally evaluation and interpretation of the output. 'High quality' in text mining usually refers to some combination of relevance, novelty, and interestingness. Typical text mining tasks may include text categorization, text clustering, concept/entity extraction, production of granular taxonomies, sentiment analysis, document summarization, and entity relation modeling (i.e., learning relations between named entities).

Text analysis may involve information retrieval, lexical analysis to study word frequency distributions, pattern recognition, tagging/annotation, information extraction, data mining techniques including link and association analysis, visualization, and predictive analytics. The overarching goal may be, essentially, to turn text into data for analysis, via application of methods such as natural language processing (NLP) and analytical methods.

With continuous advancements and an increase in user popularity, data mining and text analysis technologies may serve as an invaluable resource across a wide range of disciplines.

The technology is now broadly applied for a wide variety of needs, including government, research and business needs. Applications of text analysis may include intelligence, security, e-discovery, records management, publishing, automated ad placement, social media monitoring, scientific discovery etc.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: identifying relations between pairs of claims of a set of claims; aggregating the claims of the set of claims into a plurality of clusters based on the identified relations; generating a plurality of arguments from the plurality of clusters, wherein each argument is generated from a cluster of the plurality of clusters and wherein each argument comprises at least one claim of the set of claims; scoring each possible set of a predefined number of arguments of the plurality of arguments based on quality of each argument of the predefined number of arguments and diversity between the predefined number of arguments; and generating a speech, wherein the speech comprises a top scoring possible set of the each possible set of the predefined number of arguments.

There is provided, in accordance with an embodiment, a computer program product comprising a non-transitory computer-readable storage medium having program code embodied therewith, the program code executable by at least one hardware processor to: identify relations between pairs of claims of a set of claims; aggregate the claims of the set of claims into a plurality of clusters based on the identified relations; generate a plurality of arguments from the plurality of clusters, wherein each argument is generated from a cluster of the plurality of clusters and wherein each argument comprises at least one claim of the set of claims; score each possible set of a predefined number of arguments of the plurality of arguments based on quality of each argument of the predefined number of arguments and diversity between the predefined number of arguments; and generate a speech, wherein the speech comprises a top scoring possible set of the each possible set of the predefined number of arguments.

There is provided, in accordance with an embodiment, a system comprising: (i) a storage device having stored thereon instructions for: identifying relations between pairs of claims of a set of claims, aggregating the claims of the set of claims into a plurality of clusters based on the identified relations, generating a plurality of arguments from the plurality of clusters, wherein each argument is generated from a cluster of the plurality of clusters and wherein each argument comprises at least one claim of the set of claims, scoring each possible set of a predefined number of arguments of the plurality of arguments based on quality of each argument of the predefined number of arguments and diversity between the predefined number of arguments, and generating a speech, wherein the speech comprises a top scoring possible set of the each possible set of the predefined number of arguments; and (ii) at least one hardware processor configured to execute said instructions.

In some embodiments, the method further comprises receiving (a) said topic under consideration (TUC), (b) said set of claims, wherein each claim of the set of claims is associates with a classification tag, and (c) a set of evidence supporting and associated with the set of claims.

In some embodiments, each argument of the set of arguments further comprises: evidence of a set of evidence supporting and associated with each of the at least one claim, and one or more classification tags associated with each of the at least one claim.

In some embodiments, said identifying of relations between said pairs of claims comprises: determining the existence of one or more relations between each of said pairs of claims, and identifying the type of the one or more relations between the claims of said each of said pairs of claims.

In some embodiments, the method further comprises: for each pair of claims of said pairs of claims, computing a relatedness score based on the extent of a relation between said each pair of claims, wherein said aggregating of the claims into a plurality of clusters is according to their relatedness score.

In some embodiments, the generating of the plurality of arguments comprises: assessing the quality of the claims in each of said plurality of clusters and assigning each of said claims with a claim quality score, and selecting of said at least one claim of said each argument from claims of said cluster based on their quality score.

In some embodiments, the method further comprises generating one or more paragraphs serving as at least one of a speech opening and a speech conclusion.

In some embodiments, the method further comprises generating a counter argument, the counter argument comprising one or more claims opposing one or more opponent claims.

In some embodiments, the generating of the counter argument comprises at least one of: identifying a contrast relation between each claim of the set of claims and one or more of the one or more opponent claims, and negating one or more of the one or more opponent claims.

In some embodiments, said evidence comprises expert evidence and wherein the method further comprises generating description relating to the expert and incorporating said description in said speech.

In some embodiments, said program code is further executable by said at least one hardware processor to: compute a relatedness score, for each pair of claims of said pairs of claims, based on the extent of a relation between said each pair of claims, wherein said aggregating of the claims into a plurality of clusters is according to their relatedness score.

In some embodiments, said program code is further executable by said at least one hardware processor to generate one or more paragraphs serving as at least one of a speech opening and a speech conclusion.

In some embodiments, said program code is further executable by said at least one hardware processor to generate a counter argument, the counter argument comprising one or more claims opposing one or more opponent claims.

In some embodiments, said evidence comprises expert evidence and wherein said program code is further executable by said at least one hardware processor to generate description relating to the expert and incorporating said description in said speech.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a speech construction technique which may automatically (i.e., without human intervention) construct a speech that includes a concise yet comprehensive set of clear, coherent arguments.

The disclosed speech construction technique may receive, as input, raw claims which either support or contest a given topic. Evidence supporting the claims may be also received. A concise yet comprehensive set of arguments which form a clear and coherent case for or against the given topic may be then constructed to form a debate, such as a debate opening speech. The disclosed techniques may include a series of steps. For example, relations among claims and evidence which may be included in the received data may be identified. Next, a large set of potential arguments may be phrased, using the identified relations. Finally, a subset of such phrased arguments may be selected to convincingly present a case for or against the given topic.

Figure 1:
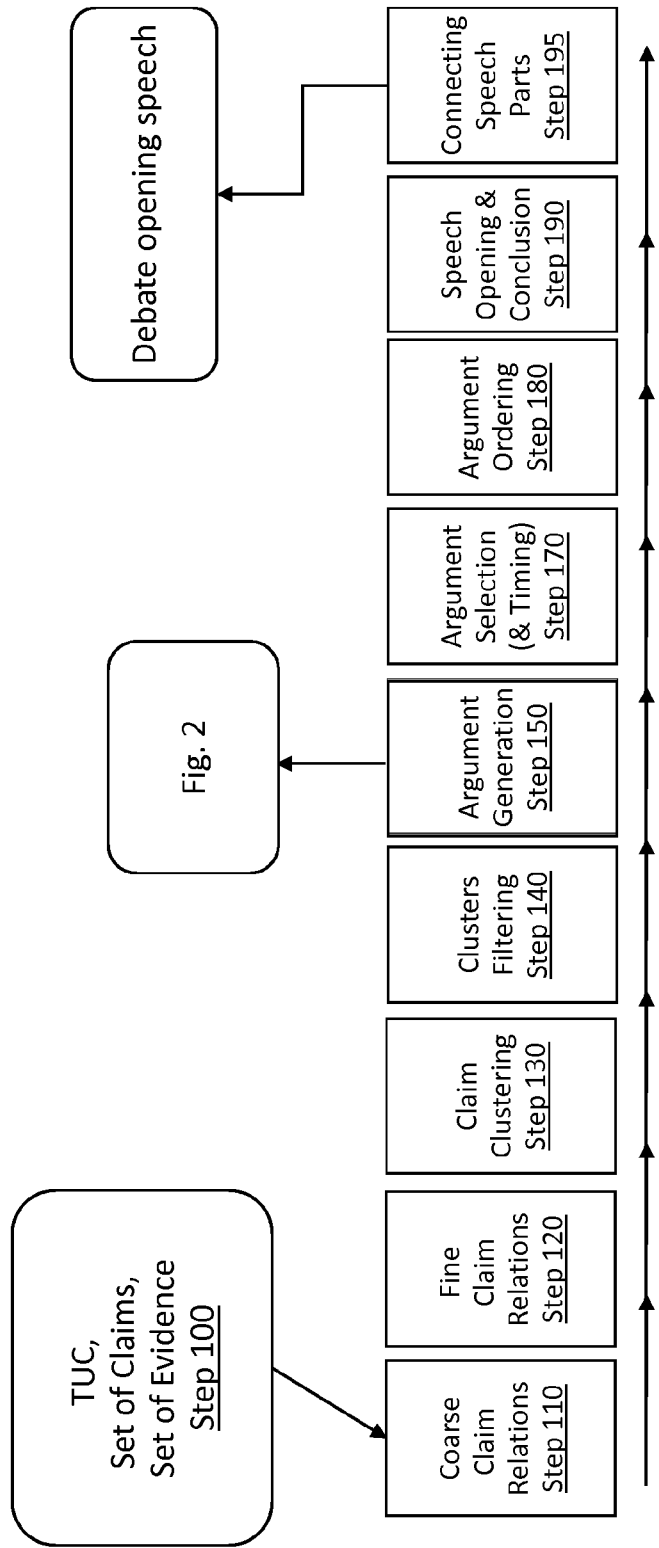
FIG. 1 shows a block diagram describing a flow of a method, constructed and operative in accordance with an embodiment of the disclosed technique.

Reference is now made to FIG. 1, which shows a block diagram describing a flow of a method, constructed and operative in accordance with an embodiment of the disclosed technique. In a step 100, a topic under consideration (TUC), a set of claims, and a set of evidence supporting and associated with the set of claims may be received. Each claim of the set of claims may be associated with one or more classification tags. A classification tag may include classification of the associated claim. A claim may be classified, for example, as a pro claim or a con claim with respect to the TUC and/or the claim may be classified as an "opinion claim" (i.e., a subjective claim which is based on an opinion) or a "factual claim" (i.e., an objective claim which is based on a fact). Optionally, a background with respect to the TUC may be also received. The background may be an introductory text which accompanies the TUC. This background may include one or more paragraphs which introduce the TUC, provide some more information with respect to the TUC and/or may furthermore explain why it is controversial. For example, in live debates, such a background is sometimes given by the moderator.

The claims, their associated classification tags and their supporting evidence may be generated and outputted by an Argument Construction Engine (ACE) as disclosed in U.S. patent application Ser. No. 14/265,408, filed Apr. 30, 2014, which is incorporated herein by reference in its entirety.

In a further step, relations between pairs of claims of the set of claims may be identified. The identification may be performed in a cascaded manner, i.e., first, it may be identified whether or not the claims are related (i.e., identifying coarse claim relations), second, the type of the relations between the claims may be deduced (i.e., identifying fine claim relations). This identification may be performed in a plurality of steps, as exemplified below. For each pair of claims, a relatedness score may be then computed based on the extent of a relation between the pair of claims.

In an optional step 110, coarse claim relations between pairs of claims of the set of claims may be identified. This may be performed by determining the existence of one or more relations between pairs of claims. Determining the existence of a coarse relation may be performed, for example, by using machine learning techniques. Thus, relevant features may be computed (e.g. similarity in word content), and a classification model may be constructed through training.

In an optional step 120, fine claim relations between the pairs of claims may be identified. This may be performed by identifying the types and nature of the relations. Such relations may be, for example, equivalence (i.e., "A is equivalent to B"), exemplification (i.e., "A is an example of B"), or implication (i.e., "A implies B"). The definition of relations between the claims may be based on predefined rules and/or machine learning techniques such as logistic regression, which may use features such as semantic relations among the words in the claims and indicative keywords obtained via bag of words and feature selection methods.

In a step 130, the claims may be aggregated to a plurality of clusters based on the identified relations. For example, a cluster may include all the equivalent claims. Thus, if A is equivalent to B and B is equivalent to C, then A, B and C may be aggregated to a single cluster. Optionally, the claims may be clustered according to their relatedness score.

Various clustering techniques, as known in the art, may be used. Thus, for example, a claim may be a member of only one cluster (i.e., the cluster is a partition). Alternatively, a claim may be a member of more than one cluster. In some embodiments, relations may be defined among the clusters, such as a hierarchy of clusters.

In an optional step 140, the clusters may be filtered. For example, if there are numerous clusters, where at least some of them have an overlapping content, some or all of the redundant clusters may be dropped. In some embodiments, such a step may not be required, and all clusters may be utilized.

In a step 150, a plurality of arguments may be generated from the set of clusters. Each argument may be generated from a single cluster. Each argument may include at least one claim of the set of claims. Each argument may further include evidence of the set of evidence (i.e., one or more pieces of evidence) supporting and associated with each claim, and one or more classification tags associated with each claim.

Figure 2:
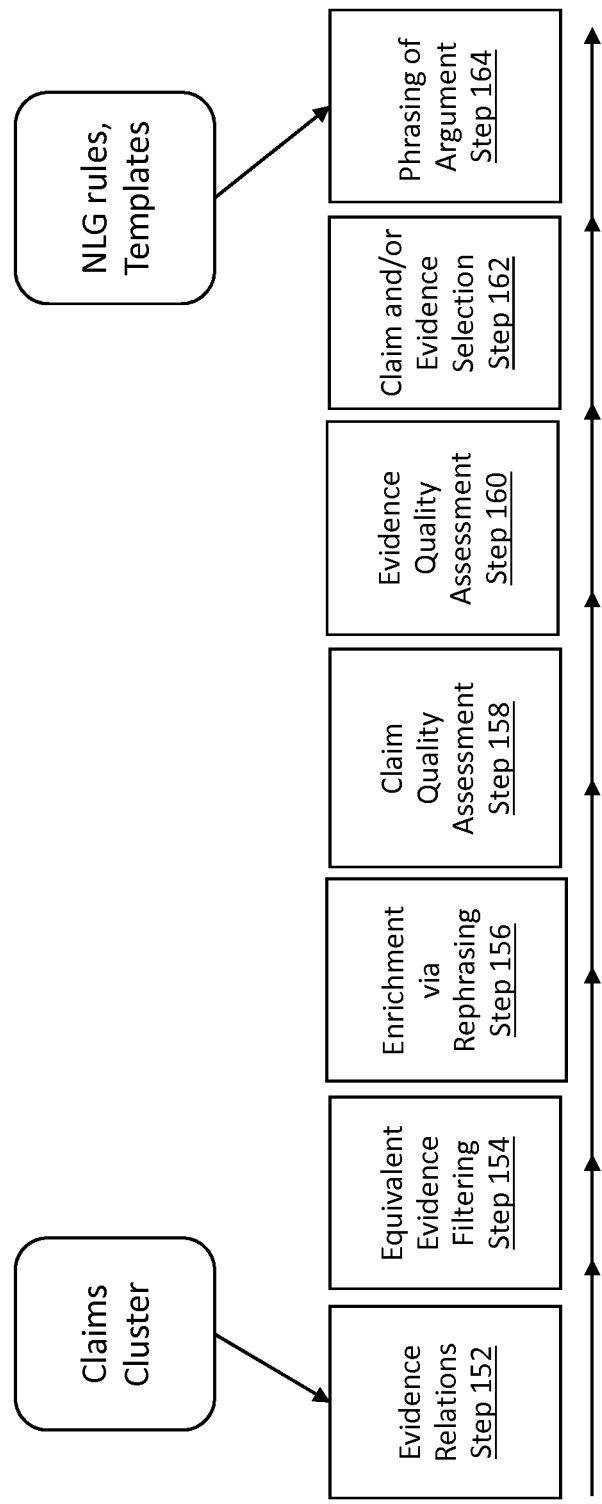
FIG. 2 shows a block diagram describing a flow of a method, constructed and operative in accordance with another embodiment of the disclosed technique.

Reference is now made to FIG. 2, which shows a block diagram describing a flow of a method, constructed and operative in accordance with another embodiment of the disclosed technique. The method shown in FIG. 2 is an exemplary method for argument generation, according to which the generation of each argument per a cluster may include a plurality of steps as will be describe herein below.

In an optional step 152, relations among the evidence supporting a specific claim may be identified. The identification may be performed in a cascaded manner as performed with respect to the claims relations (i.e., in steps 110 and 120 above). Accordingly, first, it may be identified whether or not the evidence is related, then the type of the relations between the evidence may be deduced. These relations may be identified and determined in a manner similar to the identification and determination of the claims relations, as described in steps 110 and 120 above. These relations may be utilized, for example, to filter redundant evidence, as described in step 154 below.

In an optional step 154, equivalent evidence supporting the claim may be filtered. Equivalent evidence may be evidence which present the same support but phrased differently.

In an optional step 156, enrichment via rephrasing may be performed. The enrichment may include rephrasing of claims and/or evidence. Rephrasing of a claim may be required, for example, when a claim is repeated in different sections of the speech, such as the introduction of the speech and/or its conclusion. A claim may be phrased differently in different sections of the speech in order not to repeat it word by word and such that it may fit to the specific section of the speech. Rephrasing of evidence may allow using the same piece of evidence under different timing constraints, e.g., when there is a specific time frame for presenting the evidence.

In optional steps 158 and 160, an assessment of the claim quality and/or of the associated supportive evidence may be performed. The claim and/or each piece of supportive evidence may be assigned with a claim quality score and an evidence quality score, correspondingly, reflecting how appropriate it is for use in the context of the TUC. Such a score may incorporate the quality of the claim and/or piece of evidence phrasing, its relevance, and/or the persuasiveness of its content. The scoring may be performed by using tools such as standard machine learning. Collected data may be manually annotated for quality, and a classifier, such as logistic regression, may be trained accordingly.

In an optional step 162, selections of claims and/or evidence may be performed based on their quality score. Data, i.e., claims and evidence, having a low score may be filtered since it may not be desired to include such data in the speech.

In an optional step 164, an argument may be phrased. Each argument may be phrased to include one or more claims and their associated supportive evidence. In phrasing the argument, a template may be used, including some fixed text and blanks to be filled in by the selected claims and evidence. For example, a template may be of the form: "My first point is that <claim>. In support of this, consider that <evidence>." The claims and their supporting evidence may be combined in the argument by using natural language generation (NLG) rules, as known in the art.

The NLG rules may take into account structured data derived from the claims and evidence, such as whether a claim is a fact or an opinion, or whether a piece of evidence is an expert opinion or a description of a scientific study. The classification of the claims as described herein above may be used for this task.

Multiple arguments may be generated from each cluster. Semantically, all arguments originating from the same cluster may be similar. Such arguments may differ, for example, in the specific claims and evidence they may use, and as a consequence, they may differ in phrasing and length.

With reference to FIG. 1, once arguments are generated, a speech, which may include these arguments, may be generated. The speech generation may include multiple steps, as described herein below. In an optional step, an initial selection of arguments may be performed. Each argument may be assigned with a score based on the quality of its claims and evidence, the quality of the NLG rules used to generate it and the quality of fit between the former to the latter. The quality of the NLG rules may be, for example, the richness of the template. For example, a template which requires three supporting evidence may be preferable to one without evidence, since it's more convincing. The fit between claim and evidence may refer to how relevant and persuasive the evidence is with respect to the claim. The selection of arguments may be then performed by selecting the top scoring arguments. Such initial arguments selection may be performed, for example, if the number of arguments is very large and such that the exhaustive search of the next step (as described below) may be implausible.

Quality of a claim may be determined by analyzing its phrasing (e.g. how assertive it is). Another measure for claim quality may be how often the claim (or close paraphrases of it) appears in the corpus. Quality of Evidence may stem from its source. For example, for expert evidence, the prominence or fame of the expert providing the evidence may impact quality. For Study evidence, the prominence of the people conducting the study, or the journal in which it was published may impact quality.

In a step 170, argument selection and optionally timing (i.e., selecting or adapting the argument such that it may conform to predefined time constraints) may be performed. Each possible set of a predefined number of arguments (e.g., three or four) of the plurality of arguments may be scored. The scoring may be based on a quality of each argument in a set and on the diversity among the arguments of the set. The scoring of the arguments may be performed as described above with respect to the generation of an argument. For example, each set may be selected to include three arguments. Three high-quality, yet similar, arguments, might score less than three arguments of lower individual quality, but dissimilar to one another. The selection of arguments to be included in the speech may be then performed by selecting the top scoring possible set of arguments.

The generation of the speech may further include an optional step 180 of argument ordering. The selected arguments may be ordered according to an ordering rule. For example, they may be ordered by the arguments score, or in a way that maximize the thematic similarity between consecutive arguments.

The generation of the speech may further include an optional step 190 of generating paragraphs which may serve as speech opening and conclusion. The generation of such paragraphs may be performed by using NLG rules such as templates, indicating how to combine the data into an opening or conclusion paragraph. In generating these paragraphs, the arguments already selected, as well as supplemental data related to the topic, such as a funny story or a famous quote, may be considered. The supplemental data may be extracted using dedicated engines, such as the one described with respect to claims extraction in the incorporated U.S. patent application Ser. No. 14/265,408.

Optionally, the generation of an opening may include defining the main concept or concepts with respect to the TUC via a background. It may be performed, for example, by extracting the first few sentences from relevant Wikipedia articles. The number of sentences to be extracted may be determined by using NLP (natural language processing) techniques. The relevant articles may be determined by analyzing the text of the TUC and matching it to the title of Wikipedia articles using machine-learning techniques.

For example, the text of the TUC may be analyzed using mention detection. Article titles may be retrieved using tools, such as the one described in the incorporated U.S. patent application Ser. No. 14/265,408 for automatically retrieving context-dependent textual passages. Various measures of similarity may be computed between the titles and the TUC text analysis, for example: word-to-vec euclidean distance, distance on a knowledge-graph, Explicit Semantic Analysis (ESA) and term frequency-inverse document frequency (tf-idf) correlation. These similarity measures may be then processed using a classifier to determine whether or not an article is relevant for the purpose of providing background. In addition to these measures, the classifier may also consider the number of claims detected in each article (i.e., in case such a detection was performed), and based on that, the potential quality of a background extracted from its first sentences.

The generation of the speech may further include an optional step 195 of connecting the various parts of the speech, including the opening paragraph, the selected arguments and the concluding paragraph. The connection may be performed by using NLG rules. In addition, the text of the speech may be normalized. For example, the capitalization of the text may be corrected, unclosed parenthesis may be either closed or removed etc. The speech text may be also rephrased, in order to make it more succinct and less repetitive.

In some embodiments, the method may include an optional step of generating a counter argument including one or more claims opposing one or more opponent claims. By opponent claims, it is meant, claims which are contradictive to the claims of the desired speech, for example, the claims of the opponent in a debate. The opponent claims may be extracted from an opponent speech or from an opponent argument by tools, as known in the art, and/or as disclosed in the incorporated U.S. patent application Ser. No. 14/265,408 and/or in U.S. Patent Application No. 62/014,133, the latter is also incorporated herein by reference in its entirely. The generation of the counter argument may include the steps of generating one or more opposing claims to an opponent claim and phrasing the counter argument. In some embodiments, the one or more opposing claims may be also received and a counter argument may be generated based on the received opposing claims.

An opposing claim may be generated by comparing each of the claims of the received set of claims or of another received set of claims to the opponent claim. A contrast relation may be then identified between each such pair of claims. Alternatively or additionally, claims relevant to the TUC may be detected by tools, as known in the art and/or as disclosed in the incorporated U.S. patent application Ser. No. 14/265,408 and/or 62/014,133. In such a case, the opponent claim may be used as the TUC. These claims may be also compared to the opponent claim and a contrast relation between each such pair of claims may be identified. Each claim, for which such a contrast relation is identified with respect to the opponent claim, may be used as opposing claims. Alternatively or additionally, the polarity of detected claims with respect to the TUC may be performed by tools known in the art and/or such as disclosed in the incorporated U.S. patent application Ser. No. 14/265,408 and/or 62/014,137.

Optionally, the generation of the opposing claims may include negating the opponent claim. The negating of the opponent claim may include using NLG (natural language generation) techniques and may take one of several forms, such as the ones detailed below:

Removing a negation in the opponent claim, for example: "A liberal democracy cannot be multicultural"→"A liberal democracy can be multicultural";

Adding negation to the opponent claim, for example: "state multiculturalism has failed"→"state multiculturalism not has failed", or: "all people should be treated similarly-"→"people should not all be treated similarly";

Replacing a word with its antonym, for example: "The individual savings rate has increased since the one-child policy was introduced"→"The individual savings rate has decreased since the one-child policy was introduced".

The counter argument may be phrased according to specific templates. The phrasing may be similar to the argument phrasing described above (i.e., with respect to step 164). Thus, the argument may include evidence supporting the opposing claims. Such evidence may be received and processed according to the method steps described herein above (i.e., steps 152, 154, 156, 160 and/or 162). Some exemplary templates for phrasing a counter argument may be as follows:

My opponent claimed that <opponent claim>. However, that's not true. <opposing claim>.
My opponent claimed that <opponent claim>. However, that's not true. <opposing evidence>.
My opponent claimed that <opponent claim>. However, <opposing claim>. Indeed <opposing evidence>.

Optionally, claims which may not be negated according to the above techniques may be detected (e.g., when negating the claim would not make sense). In addition, the generated opposing claims may be validated, i.e., to determine that the generated claims are in fact opposing. In order to determine when a claim may be, and has been, successfully negated, standard machine learning approach of engineering features and training a classifier may be used. Relevant features may include measures of text complexity, such as length or number of punctuation marks, as complex sentences are more difficult to negate. Other features may include the grammatical role of words in the text, such as adverbs, adjectives and some modality words, which make negation more complicated. In order to determine if a negated claim is indeed plausible to make, a relevant feature may be the ratio between n-gram counts in the original claim and that in the negated claim. That is, if in the negated claim a very unlikely n-gram (but not in the original claim) is found, this may suggest that the negated claim may be implausible.

In an optional step, description relating to an expert when using expert evidence (e.g., expert opinion) may be generated and then incorporated in the speech. Evidence of type expert may often mention the name of an expert. However, to the layman this expert may not be known, making it difficult to assess how authoritative the expert is. Thus, a description of experts may be inserted in the speech, when such a description is missing and/or when the expert is not commonly known.

The generation of such a description of the expert may include extracting a description of the expert from sources such as Wikipedia or Dbpedia. For example, the first sentence in the Wikipedia article describing the person may be identified. NLP techniques may be then used to detect the sub-sentence within this sentence which may include a succinct description of the expert.

Optionally, whether or not the expert is already described in the current speech may be determined. This may be performed by using a combination of NLP techniques as well as matching the text around the expert name with the extracted description. If such a description already exists, then the addition of such a description may not be required.

Optionally, whether the expert is well-known or not may be determined. If it is determined that the expert is well-known then adding such a description may not be required. This determination may be performed, for example, based on the view-count for the Wikipedia page of the expert.

The incorporation of the expert description may be performed in various manners as will be exemplified below.

The description may be incorporated as a relative clause, e.g.: "Peter Singer, an Australian philosopher who is the Ira W. DeCamp Professor of Bioethics at Princeton University, argues that this has made the difference between stagnation and severe cumulative decline." includes the inserted description: "an Australian philosopher who is the Ira W. DeCamp Professor of Bioethics at Princeton University".

The description may be inserted as an apposition, for example, the text: "Australian philosopher Peter Singer argues that this has made the difference between stagnation and severe cumulative decline." includes the inserted description: "Australian philosopher".

The description may be inserted as an additional sentence, for example: "Consider the words of Australian philosopher Peter Singer. He argues that this has made the difference between stagnation and severe cumulative decline.". It should be noted that the incorporation of the description may not only include the insertion of the description but also changing the original text of the speech as performed in this example, by changing the name of the expert to a pronoun.

In some cases, evidence may not mention the full name of the expert, for example, by using only the last name or using a pronoun. In such cases the full name may be inserted appropriately.

The generated speech may be outputted such that it may be used by a human user or by a machine, including other software components. The output for a human user may be by displaying the speech on a display or by printing it.

In some embodiments, a verbal speech may be generated (i.e., as opposed to a written speech) by using known in the art text to speech techniques.

An example for an argument generated according to the disclosed techniques given a TUC, a claim and associated supportive evidence, is disclosed herein below. The given TUC is: "affirmative action". An argument supporting the use of affirmative action might look as follows.
[Main Claim:]
Affirmative action is intended to promote equal opportunity.
[Evidence of type Detail:]
It is often instituted in government and educational settings to ensure that minority groups within a society are included in all programs.
[Evidence of type Detail:]
Some colleges use financial criteria to attract racial groups that have typically been under represented and typically have lower living conditions.
[Evidence of type Detail:]
In a State where the general conditions of a certain part of the population prevent or impair their enjoyment of human rights, the State should take specific action to correct those conditions. Such action may involve granting for a time to the part of the population concerned certain preferential treatment in specific matters as compared with the rest of the population. However, as long as such action is needed to correct discrimination, in fact, it is a case of legitimate differentiation under the Covenant.
[Fixed text:]
For example,
[Evidence of type Anecdotal:]
the Canadian Employment Equity Act requires employers in federally-regulated industries to give preferential treatment to four designated groups: Women, people with disabilities, aboriginal people, and visible minorities.
[Fixed text:]
Furthermore,
[Evidence of type Anecdotal:]
In 1965, President Lyndon B. Johnson issued Executive Order 11246 which required federal contractors to take "affirmative action" to hire without regard to race, religion and national origin.
[Fixed text:]
Moreover,
[Evidence of type Expert:]
According to Stefan Zillich, quotas should be "a possibility" to help working class children who did not do well in school gain access to a Gymnasium (University-preparatory school).
[Fixed text:]
In conclusion,
[Claim equivalent to main claim]
identical treatment may sometimes act to preserve inequality rather than eliminate it.

Generating a set of such arguments, preceded by an opening and ending in a conclusion may be a speech, and may be the output of the disclosed automatic speech construction.

Figure 3:
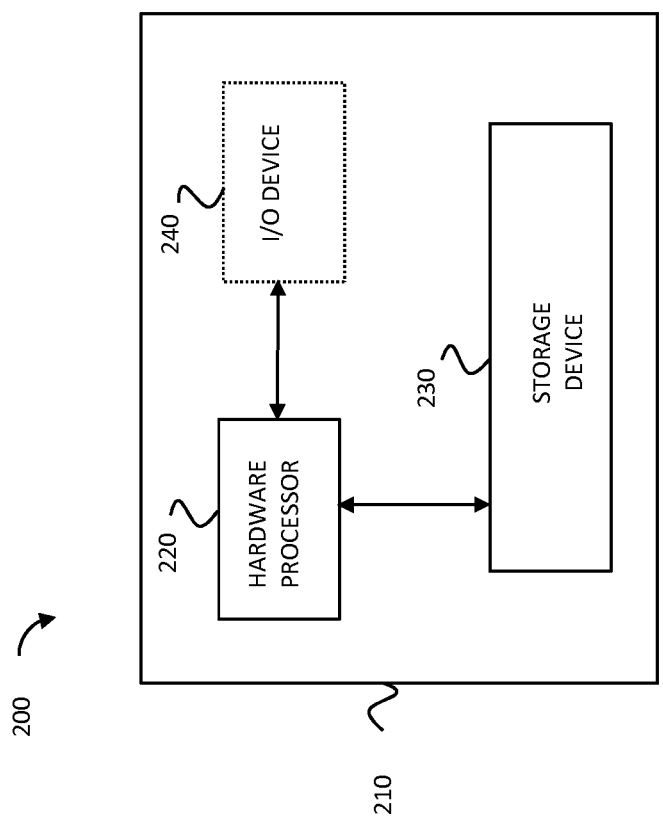
FIG. 3 shows an exemplary system according to an embodiment.

Reference is now made to FIG. 3, which shows an exemplary system 200 according to an embodiment. System 200 may include a computing device 210. Computing device 210 may include a hardware processor 220, a storage device 230 and an optional input/output ("I/O") device 240. Hardware processor 220 may include one or more hardware processors, storage device 230 may include one or more storage devices and I/O device 240 may include one or more I/O devices. Hardware processor 220 may be configured to execute the method of FIG. 1. I/O device 240 may be configured to allow a user to interact with system 200. For example, I/O device 240 may include a display, a loudspeaker and/or a printer which may for example output a speech for a user according to the method of FIG. 1. Dedicated software, implementing the method of FIG. 1 and/or FIG. 2 may be stored on storage device 230 and executed by hardware processor 220.

In some embodiments, computing device 210 may include an I/O device 240 such as a terminal, a display, a keyboard, a mouse, a touch screen, a loudspeaker, a printer, an input device and/or the like to interact with system 200, to invoke system 200 and to receive results. It will however be appreciated that system 200 may operate without human operation and without I/O device 240.

In some exemplary embodiments of the disclosed subject matter, storage device 230 may include or be loaded with a user interface. The user interface may be utilized to receive input, such as a TUC, a content and/or a background and/or provide output, such as a claim list, to and from system 200, including receiving specific user commands or parameters related to system 200, providing output, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    receiving a topic under consideration (TUC), wherein the TUC is a debatable topic in a free text format;
    learning a claim function by applying a machine learning technique to a claim training dataset, wherein the claim training dataset comprises: a content item, and claims selected from the content item by a group of people;
    providing the TUC as input to the claim function, wherein the claim function is configured to mine at least one content resource;
    applying the claim function to the at least one content resource, to extract said set of claims, wherein each claim of said set of claims is a concise statement with respect to the TUC;
    learning a classification function by applying a machine learning technique to a classification training dataset, wherein the classification training dataset comprises: an example TUC, and claims that are classified with respect to the example TUC;
    providing the TUC as input to the classification function;
    applying the classification function to the extracted claims, to output one or more classification tags for each of the extracted claims, wherein the classification tags comprise at least one of:
        a tag indicating that a certain one of the extracted claims is a pro claim with respect to the TUC,
        a tag indicating that a certain one of the extracted claims is a con claim with respect to the TUC,
        a tag indicating that a certain one of the extracted claims is a factual claim, and
        a tag indicating that a certain one of the extracted claims is a moral claim;
    automatically identifying relations between pairs of claims of a set of the extracted claims;
    automatically aggregating the claims of the set of extracted claims into a plurality of clusters based on the identified relations;
    automatically generating a plurality of arguments from the plurality of clusters, wherein each of the arguments is generated from a cluster of the plurality of clusters, and wherein each of the arguments comprises at least one claim of the set of extracted claims;
    automatically scoring each possible set of a predefined number of arguments of the plurality of arguments, based on a quality of each argument of the predefined number of arguments and on diversity between the predefined number of arguments; and
    automatically generating a speech, wherein the speech comprises a top scoring possible set of said each possible set of the predefined number of arguments.

2. The method of claim 1, further comprising using said at least one hardware processor for automatically receiving a set of evidence supporting and associated with the set of extracted claims.

3. The method of claim 2, wherein each argument of the set of arguments further comprises:
    evidence of the set of evidence supporting and associated with each of the at least one claim, and
    one or more of the classification tags associated with each of the at least one claim.

4. The method of claim 3, wherein said evidence comprises expert evidence and wherein the method further comprises generating a description relating to the expert and incorporating said description in said speech.

5. The method of claim 1, wherein said automatically identifying of relations between said pairs of claims comprises:
    determining the existence of one or more relations between each of said pairs of claims, and
    identifying the type of the one or more relations between the claims of said each of said pairs of claims.

6. The method of claim 1, further comprising using said at least one hardware processor for:

for each pair of claims of said pairs of claims, automatically computing a relatedness score based on the extent of a relation between said each pair of claims,
wherein said aggregating of the claims into a plurality of clusters is according to their relatedness score.

7. The method of claim 1, wherein the generating of the plurality of arguments comprises:
assessing the quality of the claims in each of said plurality of clusters and assigning each of said claims with a claim quality score, and
selecting of said at least one claim of said each argument from claims of said cluster based on their quality score.

8. The method of claim 1, further comprising using said at least one hardware processor for automatically generating one or more paragraphs serving as at least one of a speech opening and a speech conclusion.

9. The method of claim 1, further comprising using said at least one hardware processor for automatically generating a counter argument, the counter argument comprising one or more claims opposing one or more opponent claims.

10. The method of claim 9, wherein the generating of the counter argument comprises at least one of:
identifying a contrast relation between each claim of the set of extracted claims and one or more of the one or more opponent claims, and
negating one or more of the one or more opponent claims.

11. A computer program product comprising a non-transitory computer-readable storage medium having program code embodied therewith, the program code executable by at least one hardware processor to:
receive a topic under consideration (TUC), wherein the TUC is a debatable topic in a free text format;
learn a claim function by applying a machine learning technique to a claim training dataset, wherein the claim training dataset comprises: a content item, and claims selected from the content item by a group of people;
provide the TUC as input to the claim function, wherein the claim function is configured to mine at least one content resource;
apply the claim function to the at least one content resource, to extract said set of claims, wherein each claim of said set of claims is a concise statement with respect to the TUC;
learn a classification function by applying a machine learning technique to a classification training dataset, wherein the classification training dataset comprises: an example TUC, and claims that are classified with respect to the example TUC;
provide the TUC as input to the classification function;
apply the classification function to the extracted claims, to output one or more classification tags for each of the extracted claims, wherein the classification tags comprise at least one of:
a tag indicating that a certain one of the extracted claims is a pro claim with respect to the TUC,
a tag indicating that a certain one of the extracted claims is a con claim with respect to the TUC,
a tag indicating that a certain one of the extracted claims is a factual claim, and
a tag indicating that a certain one of the extracted claims is a moral claim;
automatically identify relations between pairs of claims of a set of extracted claims;
automatically aggregate the claims of the set of extracted claims into a plurality of clusters based on the identified relations;
automatically generate a plurality of arguments from the plurality of clusters, wherein each of the arguments is generated from a cluster of the plurality of clusters and wherein each of the arguments comprises at least one claim of the set of extracted claims;
automatically score each possible set of a predefined number of arguments of the plurality of arguments, based on a quality of each argument of the predefined number of arguments and on diversity between the predefined number of arguments; and
automatically generate a speech, wherein the speech comprises a top scoring possible set of the possible set of the predefined number of arguments.

12. The computer program product of claim 11, wherein said program code is further executable by said at least one hardware processor to automatically receive a set of evidence supporting and associated with the set of extracted claims, and wherein each argument of the set of arguments further comprises:
evidence of the set of evidence supporting and associated with each of the at least one claim, and
one or more of the classification tags associated with each of the at least one claim.

13. The computer program product of claim 12, wherein said evidence comprises expert evidence and wherein said program code is further executable by said at least one hardware processor to automatically generate a description relating to the expert and incorporating said description in said speech.

14. The computer program product of claim 11, wherein said identifying of relations between said pairs of claims comprises:
determining the existence of one or more relations between each of said pairs of claims, and
identifying the type of the one or more relations between the claims of said each of said pairs of claims.

15. The computer program product of claim 11, wherein said program code is further executable by said at least one hardware processor to:
automatically compute a relatedness score, for each pair of claims of said pairs of claims, based on the extent of a relation between said each pair of claims,
wherein said aggregating of the claims into a plurality of clusters is according to their relatedness score.

16. The computer program product of claim 11, wherein the generating of the plurality of arguments comprises:
assessing the quality of the claims in each of said plurality of clusters and assigning each of said claims with a claim quality score, and
selecting of said at least one claim of said each argument from claims of said cluster based on their quality score.

17. The computer program product of claim 11, wherein said program code is further executable by said at least one hardware processor to automatically generate one or more paragraphs serving as at least one of a speech opening and a speech conclusion.

18. The computer program product of claim 11, wherein said program code is further executable by said at least one hardware processor to automatically generate a counter argument, the counter argument comprising one or more claims opposing one or more opponent claims.

19. The computer program product of claim 18, wherein the generating of the counter argument comprises at least one of:
identifying a contrast relation between each claim of the set of extracted claims and one or more of the one or more opponent claims, and
negating one or more of the one or more opponent claims.

20. A system comprising:
(i) at least one storage device having stored thereon instructions for:
   receive a topic under consideration (TUC), wherein the TUC is a debatable topic in a free text format,
   learn a claim function by applying a machine learning technique to a claim training dataset, wherein the claim training dataset comprises: a content item, and claims selected from the content item by a group of people,
   provide the TUC as input to the claim function, wherein the claim function is configured to mine at least one content resource,
   apply the claim function to the at least one content resource, to extract said set of claims, wherein each claim of said set of claims is a concise statement with respect to the TUC,
   learn a classification function by applying a machine learning technique to a classification training dataset, wherein the classification training dataset comprises: an example TUC, and claims that are classified with respect to the example TUC,
   provide the TUC as input to the classification function,
   apply the classification function to the extracted claims, to output one or more classification tags for each of the extracted claims, wherein the classification tags comprise at least one of:
      a tag indicating that a certain one of the extracted claims is a pro claim with respect to the TUC,
      a tag indicating that a certain one of the extracted claims is a con claim with respect to the TUC,
      a tag indicating that a certain one of the extracted claims is a factual claim, and
      a tag indicating that a certain one of the extracted claims is a moral claim;
   automatically identifying relations between pairs of claims of a set of extracted claims,
   automatically aggregating the claims of the set of extracted claims into a plurality of clusters based on the identified relations,
   automatically generating a plurality of arguments from the plurality of clusters, wherein each of the arguments is generated from a cluster of the plurality of clusters, and wherein each of the arguments comprises at least one claim of the set of extracted claims,
   automatically scoring each possible set of a predefined number of arguments of the plurality of arguments, based on a quality of each argument of the predefined number of arguments and on diversity between the predefined number of arguments, and
   automatically generating a speech, wherein the speech comprises a top scoring possible set of the possible set of the predefined number of arguments; and
(ii) at least one hardware processor configured to execute said instructions.

* * * * *